(12) United States Patent
Sonobe et al.

(10) Patent No.: US 6,303,249 B1
(45) Date of Patent: *Oct. 16, 2001

(54) CARBONACEOUS ELECTRODE MATERIAL FOR SECONDARY BATTERY AND PROCESS FOR PRODUCTION THEREOF

(75) Inventors: Naohiro Sonobe; Jiro Masuko; Fumio Shibata, all of Iwaki (JP)

(73) Assignee: Kureha Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,328

(22) Filed: Jun. 27, 1997

(30) Foreign Application Priority Data

Jun. 28, 1996 (JP) ...................................... 8-186954

(51) Int. Cl.[7] ...................................................... H01M 4/58
(52) U.S. Cl. ...................................... 429/231.4; 429/231.8
(58) Field of Search ........................... 429/231.4, 231.8; 423/447.4, 447.9, 490

(56) References Cited

U.S. PATENT DOCUMENTS

| | | | |
|---|---|---|---|
| Re. 33,306 | * 8/1990 | Hayashi et al. | 429/194 |
| 4,780,112 | * 10/1988 | Lloyd et al. | 44/621 |
| 5,352,289 | * 10/1994 | Weaver et al. | 106/476 |
| 5,401,598 | * 3/1995 | Miyabayashi et al. | 429/218 |
| 5,677,082 | * 10/1997 | Greinke et al. | 429/194 |
| 5,710,092 | * 1/1998 | Baker | 502/416 |
| 5,834,138 | * 11/1998 | Yamada et al. | 429/194 |

FOREIGN PATENT DOCUMENTS 63-164177   7/1988   (JP).

* cited by examiner

Primary Examiner—Carol Chaney
(74) Attorney, Agent, or Firm—Wenderoth, Lind & Ponack, L.L.P.

(57) ABSTRACT

A carbonaceous electrode having improved capacities for doping and dedoping of a cell active substance, such as lithium, and suitable for a non-aqueous solvent-type secondary battery, is constituted by a carbonaceous material having a pore volume of at least 0.55 ml/g of pores having a pore diameter of at most 5 μm as measured by mercury injection method, a potassium content of at most 0.5 wt. % as measured by fluorescent X-ray analysis, and a specific surface area of at most 100 m$^2$/g as measured by nitrogen adsorption BET method. The carbonaceous material is advantageous produced by carbonizing a carbon precursor of plant origin having a potassium content of at most 0.5 wt. % as measured by fluorescent X-ray analysis, in contact with a stream of an inert gas optionally containing a halogen gas at a temperature of 700–1500° C.

15 Claims, 1 Drawing Sheet

CARBONACEOUS ELECTRODE MATERIAL FOR SECONDARY BATTERY AND PROCESS FOR PRODUCTION THEREOF

FIELD OF THE INVENTION AND RELATED ART

The present invention relates to a carbonaceous material suitable as an electrode material for a non-aqueous solvent-type secondary battery, and a process for production thereof. The present invention also relates to an electrode structure comprising such a carbonaceous electrode material, and a non-aqueous solvent-type secondary battery having such an electrode structure.

Non-aqueous solvent-type lithium secondary batteries having a negative electrode comprising a carbonaceous material have been proposed as a type of high energy-density secondary batteries (Japanese Laid-Open Patent Application (JP-A) 57-208079, JP-A 62-90863, JP-A 62-122066, JP-A 2-66856, etc.). When such a secondary battery is charged, lithium in a positive electrode comprising a chalcogenide, such as $LiCoO_2$, is introduced into negative electrode carbon (i.e., dopes the carbon) electrochemically. The carbon thus doped with lithium functions as a lithium electrode, from which the lithium is released (i.e., de-doped) during discharge to return to the positive electrode. Thus, a secondary battery capable of repetitive charge-discharge is formed.

As carbonaceous materials capable of providing non-aqueous solvent-type lithium secondary batteries, there is the so-called "non-graphitizable carbon" obtained by calcining phenolic resin or furan resin, the "graphitizable carbon" obtained by carbonizing pitch or tar; and activated carbon having a large specific surface area on the order of 900–2000 $m^2/g$.

There has also been proposed a process for producing a carbonaceous material for providing high-performance secondary batteries comprising treating plant fiber of, e.g., coconut shell with hydrochloric acid, etc., for removal of an inorganic substance contained therein and then carbonizing the treated plant fiber at 900–1500° C. under a reduced pressure of at most 10 kPa (European Laid-Open Patent Application (EP-A) 0700105.

However, the above-mentioned known carbonaceous materials are accompanied with a problem that a large amount of active substance, such as lithium, remains in the carbon (i.e., the carbon shows a large non-dedoping capacity) during the dedoping step, so that the active substance is wasted uselessly, and also a problem that the dedoping capacity per se determining the battery performance (discharge capacity) is relatively small.

SUMMARY OF THE INVENTION

As a result of study by our research and development group, it has already been found that a carbonaceous material obtained by carbonizing an organic material of plant origin characterized by the presence of vessel, sieve tube, plant fiber, etc., can be doped with a large quantity of active substance, and is therefore promising as a carbonaceous electrode material, and a patent application (European Patent Appln. No. 95305897.1, later laid open as EP-A 0767505) was filed based on the finding. However the carbonaceous material is liable to exhibit a relatively large non-dedoping capacity which is the amount of active substance, such as lithium, that is not completely de-doped from but remains within the carbonaceous material during a discharge step, and a reduction of the non-dedoping capacity has been earnestly desired.

Accordingly, a principal object of the present invention is to provide a carbonaceous material useful as a carbonaceous electrode material for providing high-performance secondary batteries exhibiting large capacities for doping and de-doping of an active substance, such as lithium, and also exhibiting a reduced non-dedoping capacity, i.e., a reduced amount of active substance remaining within the carbonaceous material without de-doping.

Further objects of the present invention are to provide a process for producing such a carbonaceous material, an electrode structure composed from such a carbonaceous material, and a high-performance secondary battery including such an electrode structure.

In the course of our study for obtaining high-performance carbonaceous electrode materials more suitably used for non-aqueous solvent-type secondary batteries from organic materials of plant origin, it has been found that not all the ash content (inorganic substance) contained in such an organic material adversely affect the resultant carbonaceous material obtained therefrom but the potassium element contained in the organic material adversely affects the resultant carbonaceous material. It has been further found that a carbonaceous material obtained by removing the potassium from an organic material of plant origin and then carbonizing the organic material under appropriate conditions provides an excellent carbonaceous electrode material having well-balanced performances including a small non-dedoping capacity and a large dedoping capacity in combination, and the resultant carbonaceous material has a large pore volume suitable for doping with a cell active substance not found in conventional carbonaceous electrode materials.

Incidentally, the above-mentioned EP-A 0700105 discloses an example of production of a carbonaceous electrode material through de-ashing of a carbon precursor of plant origin and carbonization of the de-ashed carbon precursor (Example 5). It has been found however that such an ordinary de-ashing treatment is not effective enough to reduce the potassium content, and the resultant carbonaceous material cannot exhibit a sufficiently reduced non-dedoping capacity (see Comparative Example 7 described hereinafter).

According to the present invention, there is provided a carbonaceous electrode material (first carbonaceous material) for a non-aqueous solvent-type secondary battery, having porus with a pore volume of at least 0.55 ml/g and a pore diameter of at most 5 $\mu$m as measured by mercury injection method, a potassium content of at most 0.5 wt. % as measured by fluorescent X-ray analysis, and a specific surface area of at most 100 $m^2/g$ as measured by nitrogen adsorption BET method.

According to another aspect of the present invention, there is provided a carbonaceous electrode material (second carbonaceous material) for a non-aqueous solvent-type secondary battery, obtained by carbonizing an organic material of plant origin, and having a potassium content of at most 0.5 wt. % as measured by fluorescent X-ray analysis, and a specific surface area of at most 100 $m^2/g$ as measured by nitrogen adsorption BET method.

It is preferred that both the first carbonaceous material and the second carbonaceous material of the present invention have a hydrogen-to-carbon atomic ratio H/C of below 0.1 as measured by elementary analysis, and an average (002)-plane spacing of at least 0.365 nm as measured by X-ray diffraction method.

According to the present invention, there is further provided a process for producing a carbonaceous electrode material for a non-aqueous solvent-type secondary battery, comprising: carbonizing a carbon precursor of plant origin having a potassium content of at most 0.5 wt. % as measured by fluorescent X-ray analysis, in contact with a stream of an inert gas optionally containing a halogen gas at a temperature of 700–1500° C.

According to the present invention, there is also provided an electrode structure for a non-aqueous solvent-type secondary battery, comprising: an electroconductive substrate and a composite electrode layer disposed on at least one surface of the electroconductive substrate; the composite electrode layer comprising the above-mentioned first or second carbonaceous material in a particulate form, and a binder.

According to the present invention, there is further provided a non-aqueous solvent-type secondary battery, comprising a positive electrode, a negative electrode, and a separator and a non-aqueous electrolytic solution disposed between the positive and negative electrodes; wherein at least one of the positive and negative electrodes comprises an electrode structure as described above.

The carbonaceous material according to the present invention is practically so-called non-graphitizable carbon capable of storing a large amount of active substance and accordingly has an essentially large capacity for doping with an active substance. In addition, the carbonaceous material according to the present invention has many pores of a relatively large diameter represented by a pore volume of at least 0.55 ml/g, of pores having and a pore diameter of at most 5 µm as measured by mercury injection method according to a first aspect, or is characterized by relatively large penetrating or open pores originated from structures, such as vessel, sieve tube and plant fiber, attributable to the starting material according to a second aspect.

Accordingly, the electrolytic solution is allowed to easily penetrate into the interior of the carbon through pores, and the active substance is allowed to easily move between the inside and outside of the carbon. As a result, it is possible to provide a carbonaceous electrode material having a small non-dedoping capacity and capable of effectively utilizing an active substance.

Further, the carbonaceous material of the present invention has a reduced content of potassium element which adversely affects the doping and de-doping characteristic of a carbonaceous material, so that a high-performance secondary battery can be prepared therefrom.

These and other objects, features and advantages of the present invention will become more apparent upon a consideration of the following description of the preferred embodiments of the present invention taken in conjunction with the accompanying drawing.

DETAILED DESCRIPTION OF THE INVENTION

Figure 1:
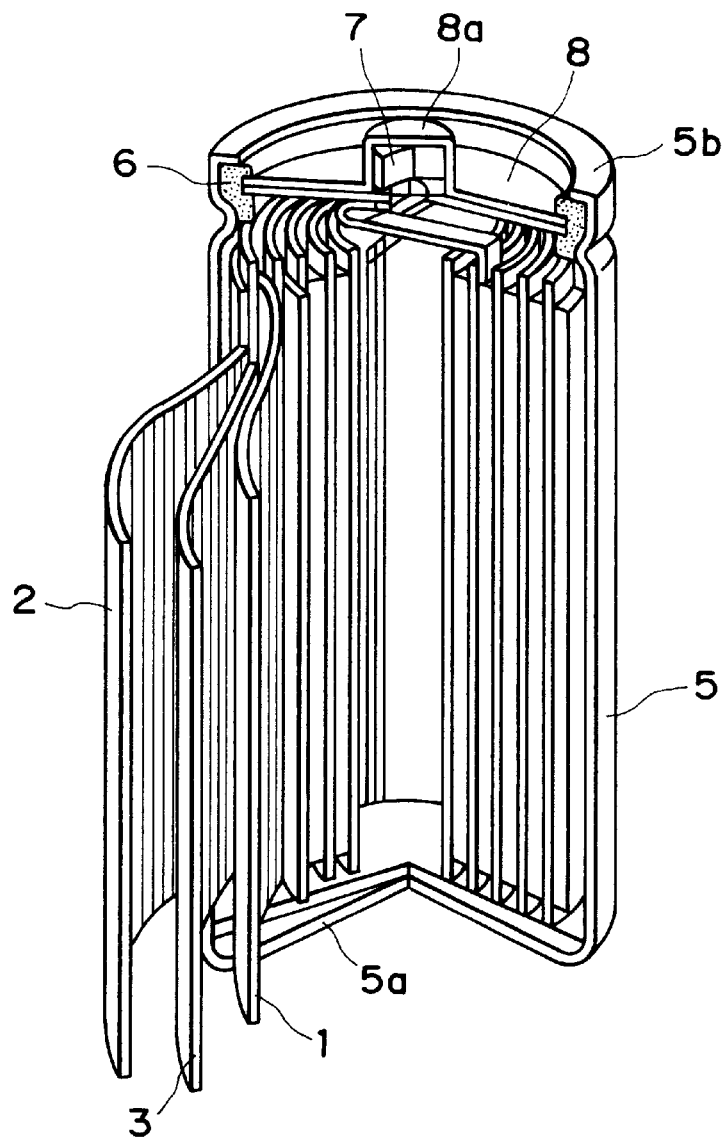
FIG. 1 is a partially exploded perspective view of a non-aqueous solvent-type secondary battery which can be constituted according to the invention.

The carbonaceous materials according to the present invention is characterized by a specific surface area of at most 100 m²/g as measured by the BET method using nitrogen as adsorbate gas, and a potassium content of at most 0.5 wt. % as measured by fluorescent X-ray analysis. The first carbonaceous material is further characterized by having pores with a pore volume of at least 0.55 ml/g and a diameter of at most 5 µm as measured by mercury injection method. A carbonaceous material having a specific surface area in excess of 100 m²/g as represented by activated carbon provides a large non-dedoping capacity, i.e., a large amount of active substance left within the carbonaceous material without dedoping. The specific surface area may preferably be 0.5–50 m²/g, more preferably 0.5–10 m²/g.

A larger potassium content is not preferred because it provides a smaller de-doping capacity and a larger non-dedoping capacity. The potassium content is preferably at most 0.4 wt. %, further preferably at most 0.3 wt. %, particularly preferably at most 0.2 wt. %.

The large pore volume is a characteristic of the carbonaceous material. A smaller pore volume makes it difficult for the electrolytic solution to penetrate into the inside of the carbon and hinders free movement of the active substance within the carbonaceous material, thereby resulting in a remarkable increase in non-dedoping capacity defined as a difference (A–B) between a doping capacity (A) and a dedoping capacity (B) and a lowering in rate of effective utilization of active substance. On the other hand, an extremely large pore volume results in a lowering in packing density of the carbonaceous material for preparing a secondary battery. Accordingly, the pore volume may preferably be 0.55–1.00 ml/g, further preferably 0.55–0.70 ml/g.

In the present invention, the carbonaceous material should be construed as a term covering a graphitic material having a developed graphite structure as obtained through heat treatment at a temperature of 2000° C. or higher. However, a high-temperature heat treatment causes a shrinkage of carbon structure and is liable to deprive the pore structures, such as vessel, sieve tube and plant fiber, originated from the starting material. Accordingly, the carbonaceous material according to the present invention may be practically advantageously realized as a carbonaceous material having an average (002)-plane spacing as measured by X-ray diffraction method (hereinafter sometimes denoted by "$d_{002}$") of at least 0.365 nm. If a carbonaceous material having $d_{002}$ of below 0.365 nm is used to constitute a negative electrode of a non-aqueous solvent-type secondary battery, the negative electrode is liable to exhibit a smaller doping capacity for a cell active substance. On the other hand, if a carbonaceous material having $d_{002}$ exceeding 0.390 nm is used to constitute a negative electrode of a non-aqueous solvent-type secondary battery, the negative electrode is liable to exhibit an increased non-dedoping capacity. $d_{002}$ is preferably 0.365–0.390 nm, most preferably 0.370–0.390 nm.

The carbonaceous material may preferably have a hydrogen-to-carbon atomic ratio H/C of below 0.1, more preferably at most 0.07. A carbonaceous material having an H/C of 0.1 or larger formed at a low carbonization temperature is not suitable as a carbonaceous electrode material for a non-aqueous solvent-type secondary battery because of an increase in non-dedoping capacity.

Now, the process for producing a carbonaceous material according to the present invention will be described.

The production process according to the present invention comprises: carbonizing a carbon precursor of plant origin having a potassium content of at most 0.5 wt. % as measured by fluorescent X-ray analysis, in contact with a stream of an inert gas optionally containing a halogen gas at a temperature of 700–1500° C. Herein, the term "carbon precursor" includes a starting organic material of plant origin, a product obtained by subjecting such an organic material to a potassium removal treatment as described hereinafter, a preliminarily calcined product of such an organic material of plant origin, and a preliminarily calcined organic material further subjected to a potassium removal treatment.

Examples of the inert gas used in the process of the present invention may include nitrogen gas, argon gas and helium gas. Example of the halogen gas optionally contained in the inert gas may include chlorine gas, bromine gas, iodine gas, and fluorine gas, but chlorine gas is particularly preferred. The halogen-containing inert gas may preferably have a halogen gas concentration on the order of 4–40 mol. %.

Preferred examples of the organic material of plant origin used in the present invention as carbon sources of the carbonaceous material may generally include: coconut shell, coffee bean, chaffs, broad-leaf tree wood, conifer wood, and bamboo. It is preferred that such an organic material of plant origin is preliminarily calcined at 300–800° C. in an inert gas atmosphere or under a reduced pressure so as to preliminarily remove its tar and other volatile contents therefrom prior to carbonization thereof. The potassium content in such a plant material varies depending on the plant species, but a carbonaceous material obtained by carbonizing a starting material having a large potassium content provides a carbonaceous electrode material exhibiting inferior performances, as represented by a small de-doping capacity and a large non-dedoping capacity for an active substance, such as lithium.

The potassium content in a carbon precursor, such as an organic material of plant origin or preliminary calcination product thereof may be reduced by subjecting the carbon precursor to a deashing or potassium removal treatment. The potassium content is at most 0.5 wt. %, preferably at most 0.4 wt. %, further preferably at most 0.3 wt. %, particularly preferably at most 0.2 wt. %. This condition should be satisfied by the carbonaceous material after carbonization but may preferably be also satisfied by the carbon precursor before the carbonization.

The removal of potassium from (i.e., deashing of) an organic material of plant origin may preferably be performed by pulverizing such an organic material of plant origin as it is or after preliminary calcination thereof at a temperature of ca. 300–800° C. into a carbon precursor, into fine particles, and then dipping the fine particles within an acid, such as hydrochloric acid, or water. If the particles to be treated for potassium removal have a large particle size, the potassium removal efficiency is liable to be remarkably lowered. The particles to be treated may preferably have a weight-average particle size (diameter) of at most 100 $\mu$m, further preferably at most 50 $\mu$m. The potassium removal treatment may preferably be applied to a carbonaceous precursor obtained by preliminarily calcining a starting organic material at ca. 300–800° C. so as to improve the potassium removal efficiency. A high preliminary calcination temperature in excess of 800° C. is not preferred because the potassium removal efficiency is rather lowered thereby.

The potassium removal treatment may be performed by dipping carbon precursor particles within an aqueous liquid inclusive of acids (aqueous solutions), such as hydrochloric acid, sulfuric acid nitric acid and hydrofluoric acid, and water per se. In case where water is used as the treating liquid, the water may preferably be used at an elevated temperature of at least 50° C., more preferably at least 80° C. since a lower water temperature results in a remarkably lower potassium removal efficiency. The dipping treatment for potassium removal may preferably be performed by repeating plural times of dipping for a relatively short period rather than a single dipping for a longer period in order to effectively increase the potassium removal efficiency. The potassium removal treatment may preferably be performed as at least one cycle, preferably at least two cycles, of dipping in an acid and then dipping in water.

The carbonization may preferably be performed while taking care so that tar or decomposition products, such as hydrogen and methane, will not hinder the pore formation in the carbon precursor. In case where the carbon precursor is carbonized in an environment rich or dense in decomposition product, the formation of minute pores is liable to be insufficient, thus resulting in a carbonaceous material having a lower capacity for doping with active substance.

As the carbon precursor inclusive of an organic material of plant origin per se is inherently porous because of the presence of vessel, sieve tube, etc., the dissipation or removal of decomposition products during the carbonization is facilitated to result in a large volume of pores having a relatively large diameter.

According to the production process of the present invention, the carbon precursor of plant origin is carbonized while flowing an inert gas or a halogen-containing inert gas (hereinafter sometimes inclusively referred to as a treatment gas) in contact with the carbon precursor. In this instance, the material to be carbonized (i.e., carbon precursor) may be disposed in a piled layer within a reactor and is carbonized while flowing the inert gas in a space outside but in contact with the layer (outside-layer flow scheme), or the material to be carbonized (carbon precursor) is disposed in a layer or bed and is carbonized while flowing the inert gas through within the layer or bed (intra-layer flow scheme).

In a batch-wise outside-layer flow scheme, it is preferred to suppress the piled layer thickness of the material to be carbonized as thin as possible so as to increase the area of contact of the material layer with the inert gas and allow quick removal of the decomposition product from the material out of the system. The piled layer thickness of the material to be carbonized may preferably be at most 50 mm, more preferably at most 30 mm. The inert gas may be supplied or flowed at a vacant reactor-basis speed of at least 1 mm/sec, more preferably at least 5 mm/sec.

It is preferred to adopt an intra-layer flow scheme of a continuous-type or a batch-type using a fluidized bed, a fixed bed, etc. In this case, the inert gas may preferably be supplied or flowed at a rate of at least 10 ml, more preferably at least 50 ml, further preferably at least 100 ml, per gram of the material to be carbonized, while it can depend on the amount of the material to be carbonized per unit time. A higher inert gas supply rate may be preferred in view of the properties of the product carbonaceous material, but practically the supply rate may be at most 500 ml per gram of the material to be carbonized. The gas supply rate referred to herein is calculated based on the volume of the treatment gas under the standard state (0° C. and 1 atm).

The carbonization may be performed at a temperature of 700–1500° C. Carbonization at a temperature below 700° C. results in an increased non-dedoping active substance capacity of the product carbonaceous material. Carbonization at a temperature higher than 1500° C. results in a decrease in capacity for doping with active substance. The carbonization temperature is 700–1500° C., preferably 900–1400° C.

Next, the non-aqueous solvent-type secondary battery of the present invention will be described.

The carbonaceous material according to the present invention has a micro-texture suitable for doping with lithium and can be suitably used as an electrode material for lithium batteries for constituting a positive electrode or a negative electrode to be doped with lithium as an active substance. It is particularly preferred that the carbonaceous material is used for constituting a negative electrode for doping with lithium as a negative electrode active substance of a non-aqueous solvent-type lithium secondary battery.

FIG. 1 is a partially exploded perspective view of a non-aqueous solvent-type lithium secondary battery as a preferred embodiment of the battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Figure 2:
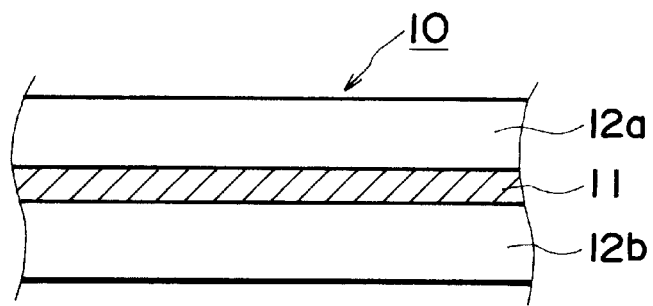
FIG. 2 is a partial sectional view of an electrode structure adopted in the secondary battery.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, copper, aluminum, nickel or titanium and having a thickness of, e.g., 5–100 $\mu$m, or 5–20 $\mu$m for a small-sized battery, and a composite electrode layer (12a, 12b) of, e.g., 10–1000 $\mu$m, preferably 10–200 $\mu$m, in thickness for a small-sized battery, on at least one surface, preferably on both surfaces as shown in FIG. 2, of the electroconductive substrate 11.

The composite electrode layers 12a and 12b are respectively a layer comprising a particulate carbonaceous material according to the present invention, an electroconductive material such as electroconductive carbon, optionally included, and a binder such as a vinylidene fluoride resin, formed on the electroconductive substrate 11.

More specifically, in the case of using the carbonaceous material according to the present invention for producing an electrode structure 10 (in FIG. 2, corresponding to an electrode 1 or 2 in FIG. 1) of a non-aqueous solvent-type secondary battery as described above, the carbonaceous material may be optionally formed into fine particles having an average particle size of 5–100 $\mu$m and then mixed with a binder stable against a non-aqueous solvent, such as polyvinylidene fluoride, polytetrafluoroethylene or polyethylene, to be applied onto an electroconductive substrate 11, such as a circular or rectangular metal plate, to form, e.g., a 10–200 $\mu$m-thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate 11 is liable to be insufficient. The above described formulation and values have been set forth with respect to production of a secondary battery of a relatively small size, whereas, for production of a secondary battery of a larger size, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery, as mentioned above.

In the latter case, the positive electrode material may comprise a complex metal chalcogenide, particularly a complex metal oxide, such as $LiCoO_2$, $LiNiO_2$ or $LiMn_2O_4$. Such a positive electrode material may be formed alone or in combination with an appropriate binder into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, $\gamma$-butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, $LiCl$, $LiBr$, $LiB(C_6H_5)_4$, and $LiN(SO_2CF_3)_2$.

As described above with reference to FIG. 1, a secondary battery of the present invention may generally be formed by disposing the above-formed positive electrode 1 and negative electrode 2 opposite to each other, optionally with a liquid-permeable separator 3 composed of, e.g., unwoven cloth or other porous materials, disposed therebetween, and dipping the positive and negative electrodes together with an intermediate permeable separator in an electrolytic solution as described above.

In the above, a cylindrical battery has been described as an embodiment of the non-aqueous solvent-type secondary battery according to the present invention. However, the non-aqueous solvent-type secondary battery according to the present invention can basically have any other shapes, such as those of a coin, a rectangular parallelepiped, or a paper or sheet.

Incidentally, the measurement of various parameters described herein, i.e., the pore volume by mercury injection method, the specific surface area by nitrogen adsorption, the hydrogen/carbon atomic ratio (H/C), the potassium content by fluorescent X-ray analysis and $d_{002}$ of carbonaceous materials, was performed in the following manner.

[Pore volume by mercury injection method]

The measurement was performed by using "AUTOPORE 9200" (available from Micromeritics Instrument Corp.) in the following manner.

A sample carbonaceous material in the form of particles having an average diameter of 10–20 $\mu$m was placed in a sample vessel, which was then evacuated for 30 min. at a pressure of at most 2.67 Pa. Then, mercury was introduced into the sample vessel and gradually injected into pores under a gradually increasing pressure (up to a maximum pressure of 414 MPa). From a relationship between pressure P and injected volume of mercury during the measurement, a pore volume distribution of the carbonaceous material sample was derived versus pore diameter D as a variant by using formulae described below. The volume of mercury injected from a pressure (0.25 MPa) corresponding to a pore diameter of 5 $\mu$m to the maximum pressure (414 MPa; corresponding to a pore diameter of 3 nm) was measured as a pore volume of pores having a diameter of at most 5 $\mu$m.

Formulae for pore diameter calculation were as follows. In case where mercury is injected (pressurized) into a cylindrical pore having a diameter D under a pressure P, the following equation is given based on a balance between a surface tension and a pressure acting on a sectional area of the pore:

$$-\pi D \gamma \cdot \cos\theta = \pi (D/2)^2 P,$$

wherein $\gamma$ represents a surface tension of the mercury, and $\theta$ denotes a contact angle between the mercury and the pore well. Accordingly, $$D=(--4\gamma \cdot \cos\theta)/P.$$

Herein, the surface tension ($\gamma$) of mercury was assumed to be 484 dyn/cm, the contact angle ($\theta$) between mercury and carbon was assumed to be 130 deg.; and the pressure P and the diameter D were expressed in the units of MPa and $\mu$m, respectively, whereby the above equation was reduced to $$D=1.27/P.$$

[Specific surface area by nitrogen adsorption]

An approximate equation $$v_m = 1/(v \cdot (1-x))$$

derived from the BET equation was used to obtain $v_m$ (amount (cm$^3$/g-sample)) of adsorbed nitrogen required to form a mono-molecular layer of nitrogen on the sample surface) from a measured nitrogen volume v at a relative pressure x (=0.3) according to the BET single-point method using nitrogen adsorption. From the thus-obtained $v_m$-value, a specific surface area $S_{BET}$ was calculated based on the following equation:

$$S_{BET}=4.35 \times v_m (m^2/g).$$

More specifically, the nitrogen adsorption onto a carbonaceous material was performed at liquid nitrogen temperature by using "Flow Sorb II 2300" (available from Micromeritics Instrument Corp.) in the following manner.

A sample carbonaceous material pulverized into an average diameter of ca. 20 $\mu$m was packed in a sample tube, and the sample tube was cooled to $-196°$ C. while flowing helium gas containing nitrogen at a concentration of 30 mol. %, thereby to cause the carbonaceous material to adsorb nitrogen. Then, the sample tube was restored to room temperature to measure the amount of nitrogen desorbed from the sample by a thermal conductivity-type detector, thereby to obtain the adsorbed nitrogen amount v (cm$^3$/g-sample).

[Hydrogen/carbon (H/C) atomic ratio]

A sample of carbonaceous material was subjected to elementary analysis by using a CNH analyzer, and a hydrogen/carbon(H/C) atomic ratio was calculated as a ratio of numbers of atoms of hydrogen/carbon based on the weight proportions of hydrogen and carbon in the sample.

[Potassium content by fluorescent X-ray analysis]

For potassium content measurement, carbon samples having prescribed potassium contents were prepared and subjected to measurement by a fluorescent X-ray analyzer to prepare a calibration curve for a relationship between potassium $K_\alpha$-ray intensity and potassium content in advance. Then, sample carbonaceous materials were subjected to measurement of potassium $K_\alpha$-ray intensities by the fluorescent X-ray analysis to obtain the potassium contents based on the calibration curve. The calibration curve was approximated into a straight line passing through the origin in a potassium content range of 0–2.5 wt. %.

The carbon samples used for making the calibration curve were prepared in the following manner. Petroleum coke free from potassium content prepared by calcination at 1200° C. was pulverized to an average particle size of 20 $\mu$m to obtain powdery carbonaceous materials. A prescribed amount of potassium hydrogen carbonate was added to each carbonaceous material and stirred after addition of some deionized water, and the resultant mixture was dried. In this way, several carbon samples having prescribed potassium contents were prepared.

The fluorescent X-ray analysis was performed by using "RIGAKU SYSTEM 3082E2" (available from Rigaku Denki K.K.) in the following manner. An upper part irradiation-type holder was used, and a sample measurement area was set within a circle having a diameter of 20 mm. More specifically, a ring having a diameter of 20 mm and a height of 5 mm was placed on a filter paper, and 0.935 g of a sample carbonaceous material was placed within the ring and surface-covered with a polyethylene terephthalate film to be subjected to the measurement. The measurement was performed by using germanium as an analyzing crystal and a proportional counter as a detector in a 2$\theta$-range of 60–73 deg. at a scanning speed of 1 deg./min.

[$d_{002}$ of carbonaceous material]

A powdery sample of a carbonaceous material was packed in an aluminum-made sample cell and irradiated with monochromatic CuK$\alpha$ rays (wavelength $\lambda$=0.15418 nm) through a graphite monochromator to obtain an X-ray diffraction pattern. The peak position of the diffraction pattern is determined by the center of gravity method (i.e., a method wherein the position of a gravity center of diffraction lines is obtained to determine a peak position as a 2$\theta$ value corresponding to the gravity center) and calibrated by the diffraction peak of (111) plane of high-purity silicon powder as the standard substance. The $d_{002}$ value is calculated from the Bragg's formula shown below.

$$d_{002}=\lambda/(2 \cdot \sin\theta) \quad \text{(Bragg's formula)}$$

EXAMPLES

Hereinbelow, the present invention will be described more specifically based on Examples and Comparative Examples. All the volumes or flow rates of treatment gases described hereinafter are values calculated under the standard state (0° C., 1 atm).

Example 1

Coconut shell char (available from M.C. Carbon K.K.) was pre-calcined for 1 hour at 600° C. in a nitrogen gas atmosphere (normal pressure) and then pulverized to form a powdery carbon precursor having an average particle size of 25 $\mu$m Then, the powdery carbon precursor was subjected to two cycles of potassium removal treatment, each including dipping within 35%-hydrochloric acid for 1 hour and then washing by dipping within boiling water for 1 hour, to obtain a treated carbon precursor. The thus-treated carbon precursor exhibited a potassium content of 100 ppm (by weight) or below. Then, 10 g of the treated carbon precursor was piled in a ca. 1–2 mm-thick layer in an alumina-made boat and then placed in a horizontal tubular furnace of 100 mm in diameter to be heated for 1 hour at 1100° C. for carbonization while flowing nitrogen gas at a rate of 10 liter/min.

The properties (including pore volume, potassium content, specific surface area ($S_{BET}$), H/C and $d_{002}$) of the resultant carbonaceous material are shown in Table 1 appearing hereinafter together with those of other Examples and Comparative Examples.

Example 2

A carbonaceous material was prepared in the same manner as in Example 1 except that the carbonization temperature was changed to 1200° C.

Example 3

A carbonaceous material was prepared in the same manner as in Example 1 except that the carbonization temperature was changed to 1300° C.

Example 4

The powdery carbon precursor prepared in Example 1 was treated for potassium removal by dipping in boiling water for 1 hour. The thus-treated carbon precursor exhibited a potassium content of 0.4 wt. %. The treated powdery carbon precursor was carbonized in the same manner as in Example 1 except that the carbonization temperature was changed to 1200° C. to prepare a carbonaceous material.

Example 5

Milled and extracted coffee bean was dried at 120° C. for 1 hour and then subjected to pre-calcination, pulverization and potassium removal treatment under similar conditions as in Example 1 to prepare a treated powdery carbon precursor. The -treated carbon precursor exhibited a potassium content of 100 ppm or below. The treated carbon precursor was carbonized in the same manner as in Example 1 except that the carbonization temperature was changed to 1200° C., to prepare a carbonaceous material.

Example 6

Mohsoh bamboo trunk (produce of Fukushima-ken, Japan; age: 3, diameter: ca. 70 mm) was pre-calcined and pulverized under the same conditions as in Example 1, to obtain a powdery carbon precursor, which exhibited a potassium content of 3.1 wt. %. The powdery carbon precursor was subjected to potassium removal treatment in the same manner as in Example to obtain a treated carbon precursor, which exhibited a potassium content of 100 ppm or below. The treated carbon precursor was carbonized in the same manner as in Example 1 except that the carbonization temperature was changed to 1200° C., thereby to obtain a carbonaceous material.

Example 7

Oak wood (produce of Fukushima-ken, Japan, age: 10, diameter: ca. 50 mm) was subjected to pre-calcination, pulverization and potassium removal treatment under similar conditions as in Example 1 to prepare a treated powdery carbon precursor. The treated carbon precursor exhibited a potassium content of 100 ppm or below. The treated carbon precursor was carbonized in the same manner as in Example 1 except that the carbonization temperature was changed to 1200° C., to prepare a carbonaceous material.

Example 8

A carbonaceous material was prepared in the same manner as in Example 1 except that the carbonization in the furnace was performed under the following conditions.

The furnace temperature was raised at a rate of 10° C./min. while flowing nitrogen gas at a rate of 10 liter/min. When the furnace temperature reached 900° C., the nitrogen was was changed to a mixture of nitrogen gas at a rate of 7 liter/min. and chlorine gas at a rate of 3 liter/min., and the furnace temperature was continually raised. After the furnace temperature reached 1100° C., the temperature was retained for 1 hour, and the chlorine gas supply was terminated, followed by cooling while flowing nitrogen gas at a rate of 10 liter/min., thereby to obtain a carbonaceous material.

Comparative Example 1

A carbonaceous material was prepared in the same manner as in Example 1 except that the potassium removal treatment of the powdery carbon precursor was omitted, and the carbonization temperature was changed to 1200° C.

Comparative Example 2

A carbonaceous material was prepared in the same manner as in Example 1 except that the potassium removal treatment of the powdery carbon precursor was omitted, and the carbonization temperature was changed to 1300° C.

Comparative Example 3

The powdery carbon precursor prepared in Example 6 and having a potassium content of 3.1 wt. % was, without being subjected to the potassium removal treatment, carbonized in the same manner as in Example 1 except that the carbonization temperature was changed to 1200° C., thereby to obtain a carbonaceous material.

Comparative Example 4

Coconut shell-based activated carbon (available from Kuraray Chemical K.K.) was pulverized to an average particle size of 25 μm to form a powdery activated carbon, which was then carbonized in the same manner as in Example 1 except that the carbonization temperature was changed to 1200° C., thereby to obtain a carbonaceous material.

Comparative Example 5

A petroleum pitch (softening point=210° C., quinoline-insoluble content=1 wt. %, H/C atomic ratio=0.63) was heated to 600° C. and held at 600° C. for 1 hour for pre-calcination, followed by pulverization to form a powdery carbon precursor having an average particle size of 20 μm, which was then carbonized in the same manner as in Example 1 except that the carbonization temperature was changed to 1200° C., thereby to obtain a carbonaceous material.

Comparative Example 6

A phenolic resin ("BELLPEARL S-870", available from Kanebo K.K.) was preliminarily cured at 170° C. for 3 min.

and cured at 130° C. for 8 hours to prepare a powdery carbon precursor, which was then carbonized in the same manner as in Example 1 except that the carbonization temperature was changed to 1200° C., thereby to obtain a carbonaceous material.

Comparative Example 7

In a 300 ml-Erlenmeyer flask, 30 g of coconut shell char ("Yashibon No. 1", available from Kuraray Chemical K.K.) pulverized to an average particle size of 1 mm or below and 100 g of 35%-hydrochloric acid were placed and shaked at 50° C. for 1 hour, followed by filtration. The filration residue was sufficiently washed with de-ionized water and dried at 120° C. for 2 hours to obtain de-ashed char. The resultant de-ashed char was pulverized into a powdery carbon precursor having an average particle size of 20 $\mu$m, which exhibited a potassium content of 0.6 wt. %. The powdery carbon precursor was then carbonized in the same manner as in Example 1 except that the carbonization temperature was changed to 1200° C., thereby to obtain a carbonaceous material.

Comparative Example 8

The treated powdery carbon precursor obtained in Example 1 was dipped in an aqueous solution of potassium hydrogen carbonate ($KHCO_3$) and then dried to obtain a potassium-carrying powder carbon precursor, which exhibited a potassium content of 2.8 wt. %. The carbon precursor was then carbonized in the same manner as in Example 1 except that the carbonization temperature was changed to 1200° C., thereby to obtain a carbonaceous material.

The basic properties of the carbonaceous materials prepared in the above Examples and Comparative Examples are inclusively shown in Table 1 appearing hereinafter.

[Doping/de-doping capacity for active substance]

The carbonaceous materials obtained in Examples and Comparative Examples were respectively used to prepare a non-aqueous solvent-type secondary battery (cell) and the performances thereof were evaluated in the following manner.

The carbonaceous material is generally suited for constituting a negative electrode of a non-aqueous solvent secondary battery. However, in order to accurately evaluate the performances of a carbonaceous material inclusive of a doping capacity (A) and a de-doping capacity (B) and also a non-dedoping capacity (A–B) for a cell active substance without being affected by a fluctuation in performance of a counter electrode material, a large excess amount of lithium metal showing a stable performance was used as a negative electrode, and each carbonaceous material prepared above was used to constitute a positive electrode, thereby forming a lithium secondary battery, of which the performances were evaluated.

More specifically, the positive electrode (carbon electrode) was prepared as follows. That is, 90 wt. parts of the carbonaceous material thus formulated in the form of fine particles and 10 wt. parts of polyvinylidene fluoride were mixed together with N-methyl-2-pyrrolidone to form a paste composite, which was then applied uniformly onto an aluminum foil. The composite, after being dried, was peeled off the aluminum foil and stamped into a 15 mm-dia. disk-shaped carbonaceous film. Separately, a 17 mm-dia. disk-shaped stainless steel net was spot-welded to an inner lid of a coin-shaped cell can of 2016 size (i.e., diameter of 20 mm×thickness of 1.6 mm), and the above-prepared disk-shaped carbonaceous film was press-bonded to the disk-shaped stainless steel net to form a positive electrode containing ca. 20 mg of the carbonaceous material.

On the other hand, a negative electrode (lithium electrode) was prepared in a glove box of an argon atmosphere in the following manner. A 17 mm-dia. disk-shaped stainless steel net was spot-welded to an outer lid of the coin-shaped cell can of 2016 size, and a 15 mm-dia. lithium disk formed by stamping a 0.5 mm-thick metallic lithium plate was press bonded onto the disk-shaped stainless steel net to form a negative electrode.

The thus-prepared positive and negative electrodes, a porous polypropylene film as a separator disposed therebetween, and an electrolytic solution comprising a 1:1 (by volume)-mixture solvent of propylene carbonate and dimethoxyethane and $LiClO_4$ dissolved therein at a rate of 1 mol/liter, were used to form a coin-shaped non-aqueous solvent-type lithium secondary battery of 2016 size together with a polyethylene-made gasket in an argon glove box.

In the lithium secondary battery thus constituted, the carbonaceous material in the positive electrode was subjected to doping and dedoping of lithium to evaluate capacities therefor.

More specifically, the doping was effected by repeating a cycle including 1 hour of current conduction at a current density of 0.5 $mA/cm^2$ and 2 hours of pause until the equilibrium potential between the positive and negative electrodes reached 5 mV. The electricity thus flowed was divided by the weight of the carbonaceous material to provide a doping capacity (A) in terms of Ah/kg. Then, in a similar manner, a current was flowed in a reverse direction to dedope the lithium from the doped carbonaceous material. The de-doping was effected by repeating a cycle including 1 hour of current conduction at a current density of 0.5 $mA/cm^2$ and 2 hours of pause, down to a cut-off voltage of 1.5 volts. The electricity thus flowed was divided by the weight of the carbonaceous material to provide a dedoping capacity (B) in terms of Ah/kg. Then, a non-dedoping capacity (A–B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100. The discharge efficiency is a measure of effective utilization of the active substance.

The performances of the lithium secondary batteries using positive electrodes of the respective carbonaceous materials measured in the above-described manner are summarized in the following Table 2.

TABLE 1

Basic properties of carbonaceous material

|  | Starting material | Carbonization temp. (° C.) | Pore volume (ml/g) | K-content (%) | $S_{BET}$ ($m^2/g$) | H/C | $d_{002}$ (nm) |
|---|---|---|---|---|---|---|---|
| Ex. 1 | coconut shell | 1100 | 0.63 | 0.01 | 0.9 | 0.01 | 0.377 |
| Ex. 2 | coconut shell | 1200 | 0.63 | 0.01 | 1.0 | 0.01 | 0.379 |
| Ex. 3 | coconut shell | 1300 | 0.60 | 0.01 | 1.2 | 0.00 | 0.380 |
| Ex. 4 | coconut shell | 1200 | 0.62 | 0.45 | 1.1 | 0.02 | 0.378 |
| Ex. 5 | coffee bean | 1200 | 0.61 | 0.02 | 1.2 | 0.00 | 0.371 |
| Ex. 6 | bamboo | 1200 | 0.82 | 0.01 | 3.0 | 0.02 | 0.375 |
| Ex. 7 | oak wood | 1200 | 0.93 | 0.01 | 1.2 | 0.02 | 0.379 |

TABLE 1-continued

Basic properties of carbonaceous material

|  | Starting material | Carbonization temp. (° C.) | Pore volume (ml/g) | K-content (%) | $S_{BET}$ ($m^2/g$) | H/C | $d_{002}$ (nm) |
|---|---|---|---|---|---|---|---|
| Ex. 8 | coconut shell | 1100 | 0.63 | 0.00 | 0.9 | 0.00 | 0.378 |
| Comp. Ex. 1 | coconut shell | 1200 | 0.62 | 0.92 | 1.1 | 0.01 | 0.376 |
| Comp. Ex. 2 | coconut shell | 1300 | 0.59 | 0.83 | 1.2 | 0.00 | 0.378 |
| Comp. Ex. 3 | bamboo | 1200 | 0.82 | 2.2 | 3.5 | 0.03 | 0.374 |
| Comp. Ex. 4 | coconut shell active carbon | 1200 | 1.05 | 0.60 | 1270 | 0.03 | 0.349 |
| Comp. Ex. 5 | petroleum pitch | 1200 | 0.38 | 0.00 | 1.7 | 0.01 | 0.355 |
| Comp. Ex. 6 | phenolic resin | 1200 | 0.42 | 0.00 | 1.0 | 0.02 | 0.377 |
| Comp. Ex. 7 | coconut shell | 1200 | 0.63 | 1.52 | 1.4 | 0.01 | 0.378 |
| Comp. Ex. 8 | coconut shell | 1200 | 0.63 | 1.52 | 1.4 | 0.01 | 0.378 |

TABLE 1

Basic properties of carbonaceous material

|  | Starting material | Carbonization temp. (° C.) | Doping capacity (A) (Ah/kg) | Dedoping capacity (B) (Ah/kg) | Non-dedoping capacity (A–B) (Ah/kg) | Discharge efficiency (%) |
|---|---|---|---|---|---|---|
| Ex. 1 | coconut shell | 1100 | 606 | 496 | 111 | 81.8 |
| Ex. 2 | coconut shell | 1200 | 560 | 473 | 87 | 84.5 |
| Ex. 3 | coconut shell | 1300 | 464 | 412 | 5.2 | 88.8 |
| Ex. 4 | coconut shell | 1200 | 544 | 455 | 99 | 81.8 |
| Ex. 5 | coffee bean | 1200 | 557 | 469 | 88 | 84.2 |
| Ex. 6 | bamboo | 1200 | 550 | 460 | 90 | 83.6 |
| Ex. 7 | oak wood | 1200 | 544 | 470 | 74 | 86.4 |
| Ex. 8 | coconut shell | 1100 | 600 | 495 | 105 | 82.5 |
| Comp. Ex. 1 | coconut shell | 1200 | 538 | 437 | 101 | 81.2 |
| Comp. Ex. 2 | coconut shell | 1300 | 422 | 362 | 60 | 85.8 |
| Comp. Ex. 3 | bamboo | 1200 | 532 | 411 | 121 | 77.3 |
| Comp. Ex. 4 | coconut shell active carbon | 1200 | 581 | 345 | 236 | 59.4 |
| Comp. Ex. 5 | petroleum pitch | 1200 | 332 | 279 | 5.3 | 84.0 |
| Comp. Ex. 6 | phenolic resin | 1200 | 504 | 294 | 210 | 58.3 |
| Comp. Ex. 7 | coconut shell | 1200 | 605 | 475 | 130 | 78.5 |
| Comp. Ex. 8 | coconut shell | 1200 | 530 | 420 | 110 | 79.2 |

In view of the battery performances shown in Table 2 in comparison with the starting material-carbonization temperatures and resultant basic properties of the carbonaceous materials, it is understood that the secondary batteries using carbonaceous materials prepared through potassium removal treatment and carbonization of carbon precursors of plant origin according to Examples exhibited a doping capacity (A) and a dedoping capacity (B) which were both high and provided an extremely small non-dedoping capacity (A–B) as a difference therebetween, thus allowing an effective utilization of cell active substance.

Especially, the results of Examples 2, 3 and 6 show it possible to realize a remarkable improvement in discharge efficiency, particularly through a remarkably increased de-doping capacity, by using a carbon precursor of a reduced potassium content in comparison with those of Comparative Examples 1, 2 and 3, respectively, corresponding thereto.

Comparative Example 8 was performed in order to confirm an ill effect of an increased potassium content. Thus, the carbonaceous material of Comparative Example 8 was prepared by causing the treated carbon precursor having a potassium content of 100 ppm or below prepared in Example 1 to carry potassium hydrogen carbonate up to a potassium content of 2.8 wt. %, followed by carbonization under the same condition as in Example 2. The resultant carbonaceous material contained 1.52 wt. % of potassium as shown in Table 1. As is understood from comparison between performances of secondary batteries prepared by using carbonaceous materials of Comparative Example 8 and Example 2, the secondary battery prepared by using the potassium-containing carbonaceous material of Comparative Example 8 exhibited clearly inferior performances. From these results, it is understood that potassium adversely affects the performances of a carbonaceous electrode material for secondary battery.

The carbonaceous material of the present invention exhibits a larger de-doping capacity and a smaller non-dedoping capacity for active substance and therefore excellent performances as a battery electrode material.

The process of the present invention can also exhibit a remarkable effect of allowing easy production of a carbonaceous electrode material for secondary battery showing excellent performances as described above by calcining and carbonizing a carbon precursor of plant origin having a specifically low potassium content under appropriate conditions.

What is claimed is:

1. A carbonaceous electrode material for a non-aqueous solvent-type secondary battery, having pores which include pores that have a pore diameter of at most 5 μm and provide a pore volume of at least 0.55 ml per gram as measured by mercury injection method, a potassium content of at most 0.5 wt. % as measured by fluorescent X-ray analysis, and a specific surface area of at most 100 $m^2/g$ as measured by nitrogen adsorption BET method and has an average (002)-plane spacing of at least 0.365 nm as measured by an X-ray diffraction method, wherein said carbonaceous electrode material is obtained by carbonizing a porous plant material and is in the form of particles having a substantially uniform composition.

2. A carbonaceous electrode material according to claim 1, having a potassium content of at most 0.3 wt. %.

3. A carbonaceous electrode material according to claim 1, having a hydrogen-to-carbon atomic ratio H/C of below 0.1 as measured by elementary analysis.

4. A process for producing a carbonaceous electrode material for a non-aqueous solvent-type secondary battery, of claim 1 comprising: carbonizing a carbon precursor of porous plant origin having a potassium content of at most 0.5 wt. % as measured by fluorescent X-ray analysis, in contact with a stream of an inert gas optionally containing a halogen gas at a temperature of 700–1500° C.

5. A process according to claim 4, further comprising preparing the carbon precursor by treating a carbon precursor in the form of particles having an average particle size of at most 100 μm with an aqueous liquid to remove potassium from the carbon precursor.

6. A process according to claim 5, wherein said aqueous liquid comprises at least one of an acid and water and the treating occurs at an elevated temperature.

7. A process according to claim 6, wherein the treating of the carbon precursor with an aqueous liquid comprises at least one cycle of treatment with an acid and then with water at an elevated temperature.

8. A process according to claim 7, wherein the treating of the carbon precursor with an aqueous liquid comprises at least two cycles of the treatment.

9. A process according to claim 5, wherein the carbon precursor in the form of particles has been prepared by preliminarily calcining an organic material of plant origin at a temperature of 300–800° C. and pulverizing the calcined organic material.

10. An electrode structure for a non-aqueous solvent-type secondary battery, comprising: an electroconductive substrate and a composite electrode layer disposed on at least one surface of the electroconductive substrate;

said composite electrode layer comprising a carbonaceous electrode material according to claim 1 in a particulate form, and a binder.

11. A non-aqueous solvent-type secondary battery, comprising, a positive electrode, a negative electrode, and a separator and a non-aqueous electrolytic solution disposed between the positive and negative electrodes;

at least one of said positive and negative electrodes comprising an electrode structure according to claim 10.

12. A secondary battery according to claim 11, wherein the electrode structure constitutes the negative electrode.

13. A carbonaceous electrode material according to claim 1, wherein the plant material is at least one member selected from the group consisting of coconut shell, coffee bean, chaffs, broad-leaf tree wood, conifer wood and bamboo.

14. A carbonaceous electrode material according to claim 1, having an average (002)-plane spacing of 0.371 to 0.390 nm as measured by x-ray diffraction method.

15. A carbonaceous electrode material for a non-aqueous solvent-type secondary battery, having pores which include pores that have a pore diameter of at most 5 μm and provide a pore volume of at least 0.55 ml per gram as measured by mercury injection method, a potassium content of at most 0.5 wt. % as measured by fluorescent X-ray analysis, and a specific surface area of at most 100 m$^2$/g as measured by nitrogen adsorption BET method and has an average (002)-plane spacing of at least 0.365 nm as measured by an X-ray diffraction method, wherein said carbonaceous electrode material is obtained by carbonizing a porous plant material and is in the form of particles which as a whole provide the average (002)-plane spacing of at least 0.365 nm.

* * * * *

UNITED STATES PATENT AND TRADEMARK OFFICE
CERTIFICATE OF CORRECTION

PATENT NO.      : 6,303,249 B1
DATED           : October 16, 2001
INVENTOR(S)     : Naohiro Sonobe et al.

It is certified that error appears in the above-identified patent and that said Letters Patent is hereby corrected as shown below:

<u>Title page,</u>
Item [73], correct the name of the Assignee to -- Kureha Kagaku Kogyo Kabushiki Kaisha --.

Signed and Sealed this

Second Day of July, 2002

*Attest:*

*Attesting Officer*

JAMES E. ROGAN
*Director of the United States Patent and Trademark Office*